United States Patent [19]

Hultman et al.

[11] 4,236,960

[45] Dec. 2, 1980

[54] PROCESS FOR CONTROLLING THE DEGREE OF CAUSTICIZATION IN THE PREPARATION OF WHITE LIQUID FROM THE CHEMICALS RECOVERED FROM BLACK LIQUOR

[75] Inventors: Bengt G. Hultman; Erik A. Berglund, both of Domsjo, Sweden

[73] Assignee: Mo och Domsjo Aktiebolag, Ornskoldsvik, Sweden

[21] Appl. No.: 52,523

[22] Filed: Jun. 27, 1979

[30] Foreign Application Priority Data

Jul. 18, 1978 [SE] Sweden .............................. 7807910

[51] Int. Cl.³ .............................................. D21C 11/04
[52] U.S. Cl. ................................ 162/30 K; 23/230 A; 162/49; 423/183; 423/DIG. 3
[58] Field of Search .................... 162/30 R, 30 K, 49, 162/DIG. 10; 422/62, 80; 423/183, 207, DIG. 3; 23/230 A

[56] References Cited

U.S. PATENT DOCUMENTS 2,161,453  6/1939  Bisby et al. .............................. 422/62

OTHER PUBLICATIONS

Jacobi et al., "Control of White Liquor Preparation", AB1 PC vol. 47, No. 4, abstract 3423(M), 1976.
Chemical Recovery in Alkaline Pulping Processes, Whitney (Editor), Tajysi Monogaysl Series No. 32., 1968, pp. 121-124
Uronen, "Computer Control in the Recovery of the Kraft Process", Tajysi/Nov. 1978, vol. 61, No. 11, pp. 57-61.

Primary Examiner—Peter F. Kratz

[57] ABSTRACT

Process is provided for controlling the degree of causticization of white liquor in its preparation from green liquor by the addition of calcium oxide, which comprises determining the sodium carbonate concentration of green liquor fed to the causticization; determining the sodium carbonate concentration of white liquor resulting from the causticization; and controlling the degree of causticization within a predetermined range while taking both sodium carbonate concentrations into account, so as to maintain the degree of causticization of the white liquor within the range despite variations in sodium carbonate concentration of the green liquor and variations in calcium oxide content of the calcium oxide added for causticization.

13 Claims, 6 Drawing Figures

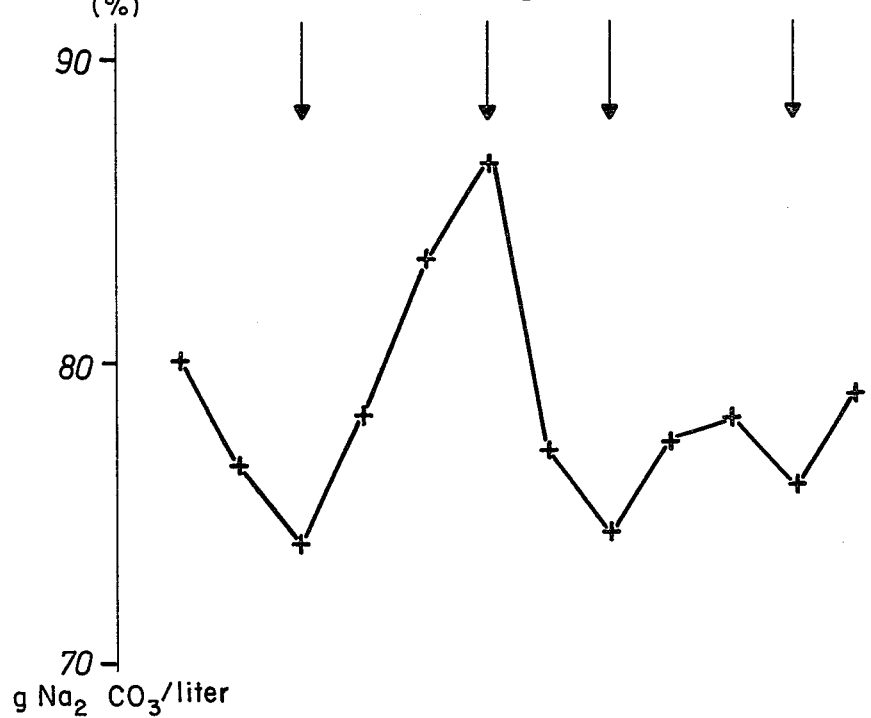
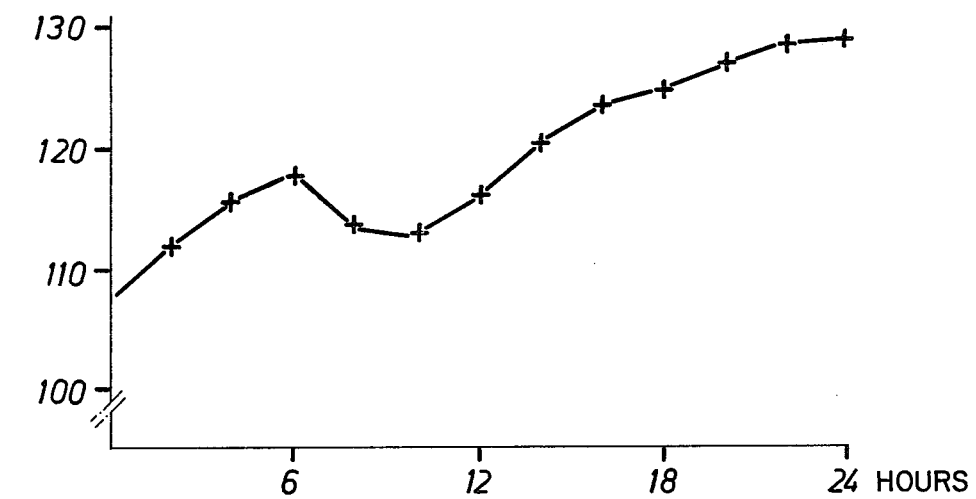
Fig. 5

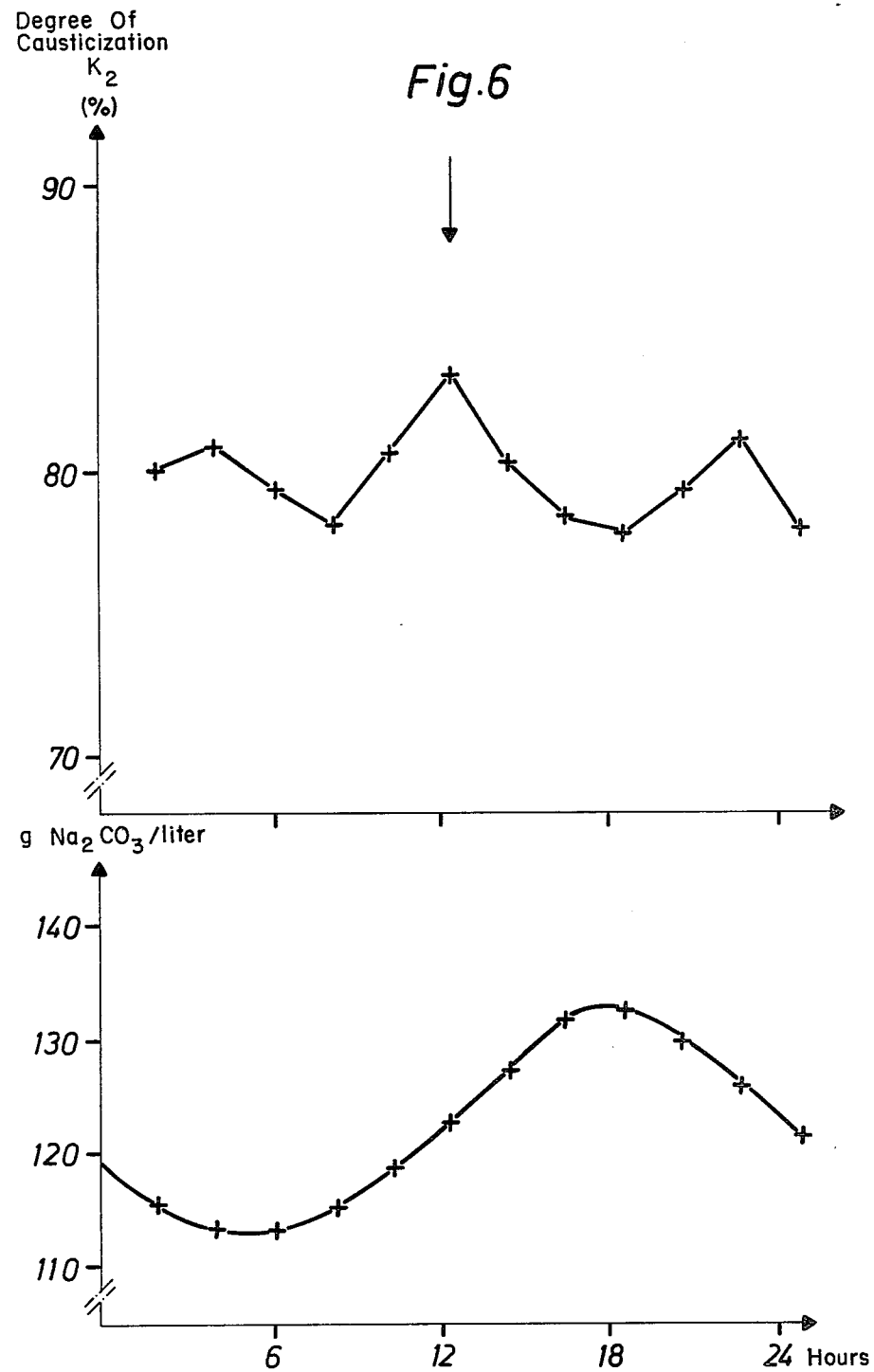

PROCESS FOR CONTROLLING THE DEGREE OF CAUSTICIZATION IN THE PREPARATION OF WHITE LIQUID FROM THE CHEMICALS RECOVERED FROM BLACK LIQUOR

IN THE DRAWINGS:

FIG. 1 represents a flow scheme of the chemicals recovery cycle in the sulfate pulping process for the preparation of sulfate pulp from lignocellulosic material.

FIG. 2 shows details of the analytical apparatus 21 of FIG. 1 for analyzing carbonate ion, especially designed for analysis of a continuous flow of samples from the green liquor and from the white liquor taken from the process at points 20 and 22, respectively.

FIGS. 5 and 6 show the variations in degree of causticization $K_2$, and in sodium carbonate content determined as carbonate ion, during a period of 24 hours in Example 4, Runs A and B, respectively.

Figure 1:
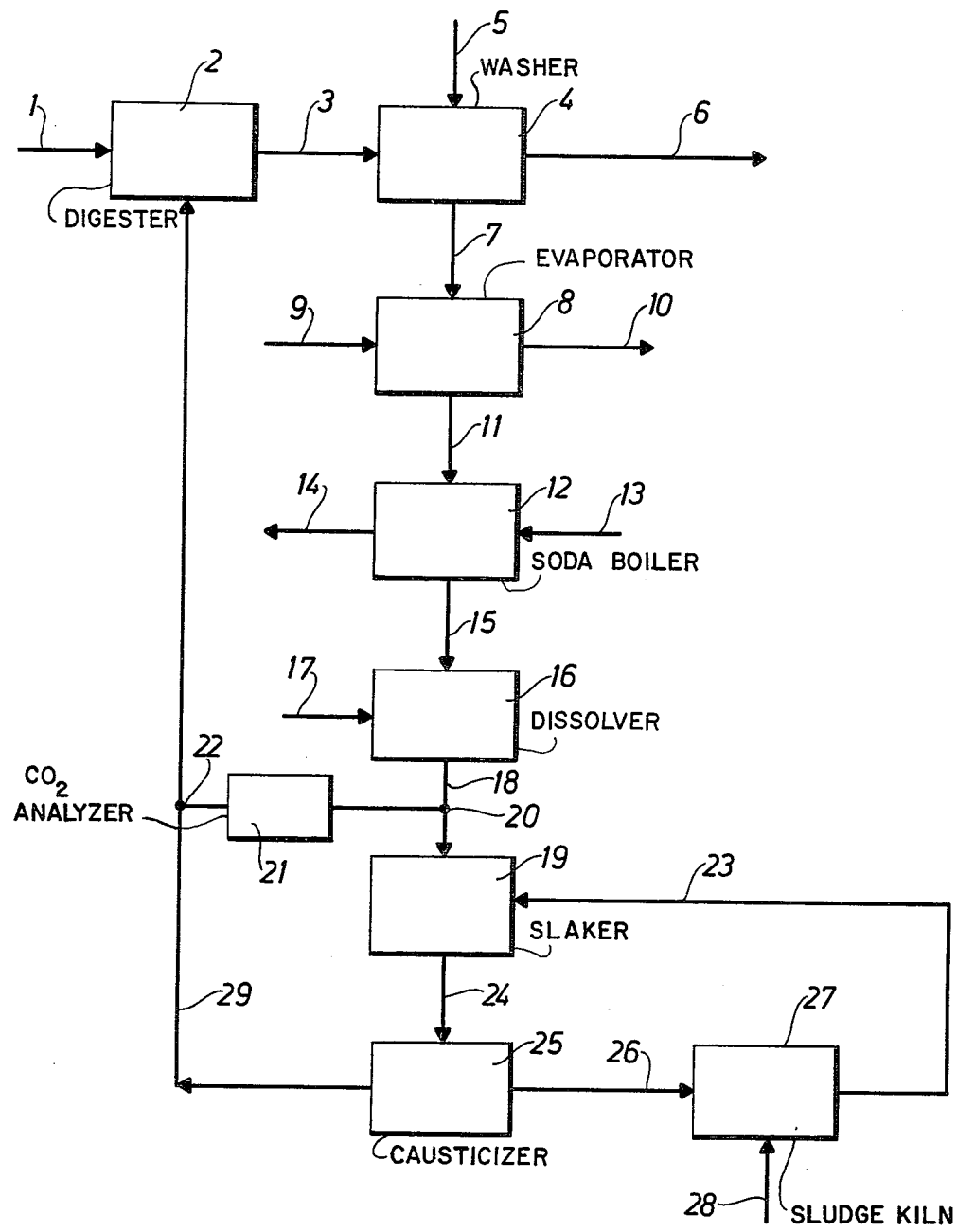

The chemicals recovery cycle in the sulfate pulping process for the preparation of sulfate pulp from lignocellulosic material is shown in the flow scheme of FIG. 1. The spent pulping liquor, referred to as black liquor, contains the spent pulping chemicals together with dissolved chemicals originating from the lignocellulosic material, and these chemicals are recovered by evaporation and combustion, after which the smelt is dissolved in water, causticized to form alkaline pulping liquor, and then recycled.

As shown in FIG. 1, the lignocellulosic material from line 1 enters the digester 2, where it is pulped or digested with alkaline pulping liquor (white liquor) from line 29. The lignin is dissolved in the course of the pulping and the cellulose pulp fibers which are liberated are conducted via line 3 in the form of an aqueous suspension to the washers 4, where wash water entering via line 5 washes out the black liquor. The black liquor is withdrawn via line 7, while the washed cellulose pulp fibers are withdrawn via line 6, and then subjected to further treatment, for example, bleaching. The black liquor which is the source of the chemicals that are recovered for recycling to the digester 2 is then processed in the five stages 8, 12, 16, 19, 25 of the chemicals recovery system shown in series connection with line 7.

First, the black liquor 7 is concentrated in the evaporators 8, with application of heat, for example, steam via line 9. A stream of steam condensate is withdrawn via line 10, while the thick concentrated black liquor is brought via line 11 to the soda boiler 12, where the liquor is combusted to remove the remainder of the water and melt the residual combusted chemicals to a smelt. Oil can be added via line 13 to aid in the combustion of the thick black liquor. The water evaporated in the combustion is withdrawn as steam via line 14, while the molten chemical smelt is withdrawn via line 15 and conducted to the dissolver 16, where it is dissolved in water entering via line 17.

The resulting green liquor then passes via line 18 to the slaker 19, where it is mixed with calcium oxide admitted via line 23. The resulting mixture of green liquor and calcium oxide then passes via line 24 to the causticizer 25, where the green liquor is converted by reaction with the calcium oxide to form a mixture of sodium hydroxide in solution and calcium carbonate sludge (also referred to as lime sludge). The lime sludge is withdrawn via line 26 to the lime sludge kiln 27, where it is combusted by oil added via line 28, re-forming calcium oxide, which is recycled via line 23 to the shaker 19. The white liquor from the causticizer 25 passes via line 29 to the digester 2.

The composition of green liquor is variable, according to the plant, but is composed primarily of sodium carbonate, with a large amount of sodium sulfide, and some sodium sulfate. A typical composition is given by Rydholm, *Pulping Processes,* at pages 797.

On occasion, the green liquor may contain sodium hydroxide, in addition to or instead of sodium sulfate, at relatively high concentrations. A typical analysis of such a green liquor is given by Rydin in *Svensk Pappers-tidning* No. 2, 1978, page 45:

|  | Moles/liter |
|---|---|
| $Na_2CO_3$ | 1.15 |
| NaOH | 0.6 |
| $Na_2S$ | 0.6 |

In addition to these chemicals, sodium thiosulfate, sodium sulfite and sodium polysulfides may also be present in small amounts.

Sodium carbonate is insufficiently alkaline to serve as a pulping alkali by itself. It needs to be converted to sodium hydroxide and the purpose of causticization is to convert the sodium carbonate in the green liquor to sodium hydroxide. Since sodium carbonate is virtually inert in sulfate pulping, the conversion to sodium hydroxide should be as quantitative as possible. The causticization is accomplished by reaction of calcium oxide with the sodium carbonate. The principal chemical rections during causticization are the following:

1. $CaO + H_2O \rightarrow Ca(OH)_2$
2. $Ca(OH)_2 + Na_2CO_3 \rightleftharpoons 2NaOH + CaCO_3 \downarrow$ However, while a quantitative conversion of sodium carbonate to sodium hydroxide is the desideratum, it is not easy to achieve. A typical causticized white liquor (given by Rydholm, *Pulping Processes* at page 799) contains a substantial amount of sodium carbonate.

The exact composition of the white liquor is of course variable, according to the mill, because of variations in the pulping process and in the recovery process. If a flue gas scrubber is used, for example, sodium thiosulfate will be found in the white liquor. The sulfidity may also differ from mill to mill, but is usually within the range from 25 to 45%.

The degree of causticization that can be obtained depends, among other things, on the relative concentration and type of chemicals in the green liquor, the sulfidity, the reaction time, the temperature, the amount of lime, and the calcium oxide content of the lime, since commercial grades of lime are normally not pure CaO. An average and normal degree of causticization, Rydholm suggests at page 799, is about 80%.

The degree of causticization of green liquor is usually monitored and controlled by manual analysis of the causticized white liquor. The concentration of sodium hydroxide and sodium carbonate is determined titrimetrically, and from these values the degree of causticization $K_1$ is then calculated according to the equation:

$$K_1 = \frac{[NaOH]_{white\ liquor}}{[NaOH]_{white\ liquor} + 2[Na_2CO_3]_{white\ liquor}}$$

One then seeks to adjust the amount of lime (CaO) added to the slaker 19 in such a way as to keep $K_1$, the degree of causticization, constant and as high as possible. As a practical matter, however, it is not possible to maintain a degree of causticization within the range from 80 to 85% because of variations in the green liquor and in the purity of the lime, i.e., the percent of calcium oxide, as noted above, and consequently one needs to accept wide variations over the range from about 70% to about 85%. Such wide variations in causticization of the white liquor, i.e., the pulping liquor, lead of course to corresponding variations in the pulping, and this greatly increases the variations in the quality of the pulp that is obtained. While it would be desirable to control the degree of causticization within narrower limits, in fact it has not been possible to achieve this by the control methods in current use.

In accordance with the present invention, an improved control of the causticization process is obtained, making it possible to maintain the range of the degree of causticization within the range from about 80 to about 85%. This is done by taking into account variations in the quality of the lime as well as variations in the sodium carbonate concentration of the green liquor, by determining not only the carbonate ion concentration of the causticized white liquor, but also the carbonate ion concentrtion in the green liquor. With the two determinations, one can take all of the main variables into account in adjusting the amount of calcium oxide that is added during causticization, with the result a much better control within a narrower range of the degree of causticization.

Accordingly, in the process of the invention, one determines the carbonate ion concentration of the starting green liquor, and the carbonate ion content of the causticized white liquor, and then controls the addition of calcium oxide to the green liquor accordingly to maintain the degree of causticization within a predetermined range.

Further in accordance with the invention, the determination of the carbonate ion content of both the green and white liquors is made automatically.

The degree of causticization $K_2$ that is determined in accordance with the invention is more precise than the usually determined degree of causticization $K_1$, and is expressed by the following relationship:

$$K_2 = \frac{[Na_2CO_3]_{green\ liquor} - [Na_2CO_3]_{white\ liquor}}{[Na_2CO_3]_{green\ liquor}}$$

As can be seen, the sodium carbonate concentrations of both green and white liquor appear in the numerator. Only if the green liquor does not contain any sodium hydroxide before causticization does $K_1 = K_2$. If the green liquor contains sodium hydroxide, $K_1 \sim K_2$, and calculating by the equation for the degree of causticization $K_1$ does not give an effective control over the causticization. Calculating the degree of causticization according to the equation for $K_2$ does however give precise control, because it takes the sodium carbonate concentration in the green liquor into account, as well.

Moreover, in following the procedure in accordance with the invention, it is only necessary to determine sodium carbonate concentration. In following the causticization formula expressed by $K_1$, which requires knowledge of NaOH and $Na_2CO_3$ concentrations, it is necessary to determine both hydroxide ion and carbonate ion concentration.

In accordance with the invention, the sodium carbonate concentration is determined as carbonate ion concentration both in the green liquor and in the white liquor. Carbonate ion concentration is determined using a carbon dioxide analyzer which is capable of ascertaining the amount of carbonate ion in terms of the amount of carbon dioxide liberated upon acidification of the green liquor or white liquor. Accordingly, the invention also provides a carbon dioxide analyzer comprising means for acidifying alkaline carbonate ion-containing liquor, such as green liquor or white liquor, to liberate carbon dioxide; means for collecting liberated carbon dioxide; and means for determining the amount of liberated carbon dioxide as a function of carbonate ion concentration. Preferably, means is also provided for oxidizing and thus inhibiting gas liberation from other substances liberating gases in acidified solution, such as sodium thiosulfate, sodium sulfide, sodium sulfite and sodium dithionate.

The carbon dioxide determination can be made by any available analytical technique for carbon dioxide, such as, for example, determining the pressure or volume of carbon dioxide liberated; effecting an infrared or photometric analysis for carbon dioxide; measuring heat conductivity of the liberated gas; measuring the electric conductivity of a solution in which carbon dioxide is absorbed; measuring the carbon dioxide flow by means of a rotameter; and other techniques. Pressure measurement is however preferred.

It is further preferred that the determinations of carbonate ion concentration in the green liquor and in the white liquor be made from samples of the green liquor taken directly before admission to the slaker and from samples of white liquor taken immediately after release from the causticization vessel.

By measuring the flow of green liquor and the carbonate ion concentration of the green liquor, the flow of carbonate ion per unit time can be estimated.

By measuring the flow of white liquor and the carbonate ion concentration of the white liquor, the flow of carbonate ion per unit time can be estimated. From the determination on white liquor the variations in lime quality can be detected and adjustments made to take this into account.

Then, the flow of calcium oxide per unit time can be proportioned in accordance with the flow of carbonate ion in the green and white liquor, knowing that variations in carbonate ion concentration in the green liquor and in the calcium oxide content of the lime used can be taken into account.

The process makes possible an instantaneous proportioning of the addition of lime or calcium oxide, according to carbonate flow in the green liquor, as well as a continuous adjustment of the proportioning in accordance with the measurement of carbonate flow in the white liquor that is obtained from the causticization.

The accuracy of the carbonate ion determination is facilitated by destroying before acidification of the sample in the analysis chemical components present in the green and white liquor samples that can give rise to gaseous reaction products after acidification of the sample during the determination, such as, for example, sulfide, polysulfide, dithionate, sulfite and thiosulfate ions, which in acid solution give rise to $H_2S$ or $SO_2$. Accordingly, an oxidizing agent is preferably added to the sample of green liquor or white liquor before acidification in the analysis, in order to oxidize these compounds to sulfate, and thus prevent the formation of gaseous reaction products that can interfere with the accuracy of carbon dioxide gas determination.

The amount of oxidizing agent added should be that needed for the reaction and no more, so that the oxidizing agent is itself substantially consumed before the carbonate ion determination, in order to prevent it from contributing to the gaseous reaction products. Otherwise, the residue of oxidizing agent has to be destroyed, as by heating the sample before acidification. This is particularly true of hydrogen peroxide, which is a preferred oxidizing agent. Any gaseous reaction product formed in the reaction with the oxidizing agent and from the oxidizing agent itself must of course be removed from the sample before the determination of carbonate ion content is started, and this can be done by heating the sample and/or by subjecting it to a vacuum in a closed vessel.

It is possible to determine sulfide ion concentration in addition to carbonate ion concentration if two analyses are carried out: one analysis after the addition of hydrogen peroxide as the oxidizing agent so as to destroy sulfide and determine only carbonate in terms of the total volume or pressure of carbon dioxide gas, and one analysis without the addition of hydrogen peroxide, in which the sum of carbonate and sulfide ion concentration is determined in the carbonate ion analysis in terms of the total volume or pressure of hydrogen sulfide and carbon dioxide gas. One can then make the determination of hydrogen sulfide and therefore sulfide concentration by subtraction of the first from the second.

Figure 2:
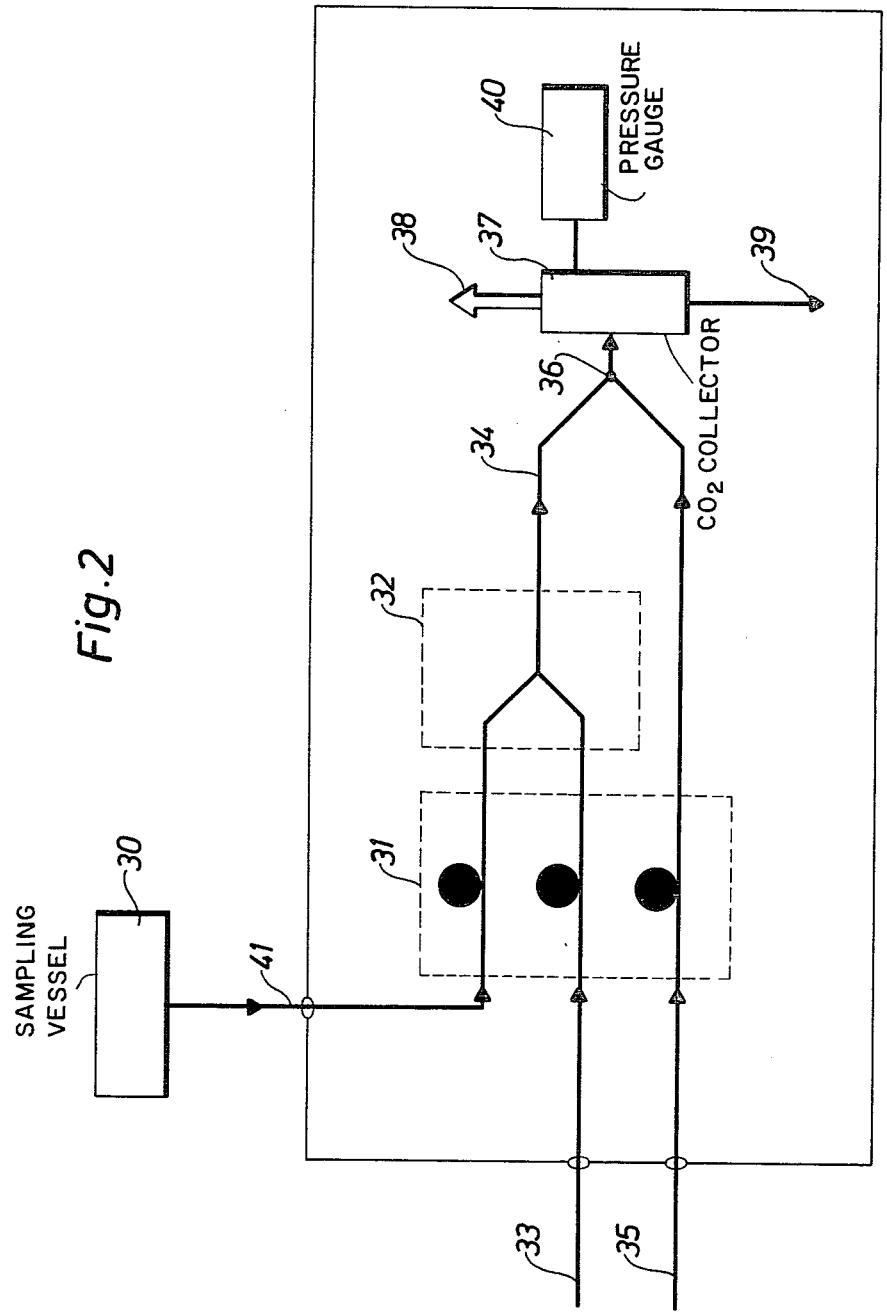

Details of the analytical apparatus 21 in FIG. 1 for analyzing carbonate ion are shown in FIG. 2. This apparatus is especially designed for analysis of a continuous flow of sample from the green liquor and from the white liquor. If two such apparatus are used, one for green and one for white liquor, a continuous determination of $K_2$ is possible, an advantage for a pulp mill with a continuous flow chemicals recovery system. However, it can also be used for intermittent or batch sample analyses, if desired.

The test samples of green liquor and white liquor taken from the process (as for example, shown in FIG. 1 at points 20 and 22, respectively) are both carried separately, one at a time, to the sample-taking vessel 30, whence they are taken for separate analysis, one at a time, through the line 41 by means of the multi channel pump 31 to the oxidizing unit 32, where the sample is mixed with oxidizing agent (such as, for example, hydrogen peroxide solution) by way of the line 33. Thereupon interfering noncarbonate ions such as sulfide, polysulfide, dithionate, sulfite and thiosulfate react with the oxidizing agent and form sulfate ion, which does not give rise to gaseous by-products during the acidification step which follows and therefore does not interfere with the analysis for carbonate as carbon dioxide gas by liberating $H_2S$ or $SO_2$, as do sulfide, sulfite, dithionate and thiosulfate, giving too high a value. Any gaseous byproducts from the oxidation reactions are vented from the vessel 32, where the sample can be heated and the vessel evacuated to aid in gas removal. The sample is then carried via line 34 to the mixing point 36, where the sample is mixed with an acid solution, such as dilute aqueous sulfuric acid, via line 35, so as to acidify the sample and convert carbonate ion to carbon dioxide gas.

The carbon dioxide gas that is liberated upon acidification of the solution collects in the vessel 37 and is withdrawn via the capillary line 38. Because of the restricted flow through the capillary, a pressure of carbon dioxide gas is created in the vessel 37. This pressure can be measured by way of a pressure gauge 40, and is of course a function of the carbonate ion concentration in the test sample. Thus, by calibration of the pressure gauge, the scale can be arranged to read off the carbonate ion concentration according to the pressure in the vessel. However, other measuring techniques can be used, such as infrared or photometric analysis, measurement of heat conductivity, rotameter measurement of flow through the capillary 38, measurement of the electric conductivity of an aqueous solution used to absorb the carbon dioxide escaping via the capillary 38, and other conventional carbon dioxide analytical mesurements. The pressure mesurement is however easy, accurate, and particularly suitable, because it is well adapted for continuous carbon dioxide pressure measurement from a steady steam of sample, thus giving a continuous monitoring of causticization, a desirable feature for a pulp mill using continuous flow digesters and chemicals recovery systems, although it can also be used intermittently, if desired.

While hydrogen peroxide is a preferred oxidizing agent, because there are no byproducts that remain with the sample, other oxidizing agents can be used, such as potassium permanganate, potassium persulfate, potassium bichromate, sodium and potassium hypochlorite, and chlorine gas.

As indicated previously, the amount of oxidizing agent added should be only just sufficient to decompose the compounds giving rise to other gases, without an excess which can itself contribute oxygen gas and possibly water in the vessel 37. If for some reason an excess nonetheless is added, any surplus oxidizing agent can be destroyed in the vessel 32 before the sample is led on to the mixing junction 36. Thus, for example, excess hydrogen peroxide can be decomposed by heating the sample in the vessel 32, after which the oxygen liberated is vented to the atmosphere before the test sample reaches the mixing point 36.

For the acidification of the test sample to liberate carbon dioxide, any acid can be used. Sulfuric acid is preferred, because it is inexpensive and does not give rise to precipitates, nor does it have itself a vapor pressure that can upset the accuracy of the carbon dioxide measurement if a pressure gauge is used. Other acids which can be used include hydrochloric acid, nitric acid, phosphoric acid, and perchloric acid.

If the green or white liquor contains suspended materials, such as calcium carbonate sludge and other particles, which can also give rise to carbon dioxide or other gases upon acidification, or which interfere with the free flow of sample through the system by giving rise to deposits in portions of the line where flow is slow, leading to blockages, they have to be separated before the sample is brought to the analyzing unit 30. For this purpose, a filter can be interposed across line 41 or line 34, with fine enough pores to separate the suspended material. A fine-pored polyethylene filter of fibrous or open cell foam material is suitable for this purpose, since it is acid-resistant, and easy to clean.

The following Examples in the opinion of the inventors represent preferred embodiments of the invention:

EXAMPLE 1

The accuracy of the analytical apparatus of FIG. 2 was evaluated in a series of determinations made on seventeen different test samples from different green and white liquors containing varying amounts of sodium carbonate, sodium hydroxide, sodium sulfide and sodium thiosulfate. The sample was flowed in a steady stream through the apparatus. The samples were placed in the vessel 30, and led out at a flow rate through the line 41 of 2 ml/minute. As the acidifying agent, 4.5 molar aqueous sulfuric acid solution was run through the line 35 at a flow rate of 2 ml/minute. The oxidizing agent used was 15% aqueous sodium peroxide solution, also at a flow rate of 2 ml/minute.

For evaluation purposes, a number of control runs were also made using pure aqueous sodium carbonate solutions, to establish that other chemicals present in the green and white liquors were not interfering with the analyses. In the analyses of the pure sodium carbonate solutions, the flow of sodium peroxide (which of course was unnecessary, since no interfering chemicals were present) was replaced by a flow of water at the same rate, to ensure comparable dilution of the sample.

The pressure gauge gave an electric signal expressed in millivolts that was calibrated to show the pressure of carbon dioxide in the vessel 37.

The following results were obtained:

TABLE 1

| Test Sample | Run No. | Concentration in g/liter of test sample solution | | | | Pressure measurement signal (millivolts) | Ratio of millivolts: carbonate content |
|---|---|---|---|---|---|---|---|
| | | $Na_2CO_3$ | $Na_2S$ | NaOH | $Na_2S_2O_3$ | | |
| Sodium Carbonate | 1 | 30.0 | 0 | 0 | 0 | 36.0 | 1.20 |
| | 2 | 40.0 | 0 | 0 | 0 | 48.5 | 1.21 |
| | 3 | 50.0 | 0 | 0 | 0 | 59.5 | 1.19 |
| | 4 | 100.0 | 0 | 0 | 0 | 118.5 | 1.19 |
| | 5 | 120.0 | 0 | 0 | 0 | 142.0 | 1.18 |
| | 6 | 150.0 | 0 | 0 | 0 | 177.5 | 1.18 |
| Green Liquor | 7 | 90.0 | 30.0 | 25.0 | 15.0 | 107.0 | 1.19 |
| | 8 | 90.0 | 40.0 | 25.0 | 15.0 | 104.5 | 1.16 |
| | 9 | 90.0 | 50.0 | 25.0 | 15.0 | 105.5 | 1.17 |
| | 10 | 110.0 | 45.0 | 25.0 | 15.0 | 130.2 | 1.18 |
| | 11 | 125.0 | 45.0 | 25.0 | 15.0 | 148.0 | 1.18 |
| | 12 | 140.0 | 45.0 | 25.0 | 15.0 | 165.0 | 1.18 |
| | 13 | 150.0 | 45.0 | 25.0 | 15.0 | 177.0 | 1.18 |
| White Liquor | 14 | 20.0 | 45.0 | 95.0 | 15.0 | 24.2 | 1.21 |
| | 15 | 30.0 | 45.0 | 95.0 | 15.0 | 36.5 | 1.22 |
| | 16 | 40.0 | 45.0 | 95.0 | 15.0 | 47.9 | 1.20 |
| | 17 | 50.0 | 45.0 | 95.0 | 15.0 | 59.0 | 1.18 |

The ratio of the pressure measurement signal in millivolts to carbonate ion concentration was found to be constant in all of the runs, whether pure sodium carbonate solution, green liquor or white liquor was being analyzed. This showed that the relationship is linear, and that the same accurate analytical results are obtained with green liquor and with white liquor as with pure aqueous sodium carbonate solution, attesting to the accuracy of the technique.

EXAMPLE 2

A series of eleven samples was taken from the green liquor stream in a pulp mill and analzyed for carbonate ion concentration using the apparatus of FIG. 2. The sample-taking unit 30 for green liquor was connected with the process line 18 at the point 20, just before the slaker 19. The sample flow, acid flow and peroxide flow were as in Example 1. The flow of test sample through the line 41 was at a flow rate of 2 ml/minute. A 4.5 molar aqueous sulfuric acid solution at a flow rate of 2 ml/minute was run through line 35, while an aqueous 15% sodium peroxide solution was added in line 33 at a flow rate of 2 ml/minute.

At the same point 20, samples of the green liquor were also taken, for comparative manual titrimetric analysis according to the standard method SCAN-N 2:63. The reversal points were determined with a pH electrode, instead of pH indicators.

Figure 3:
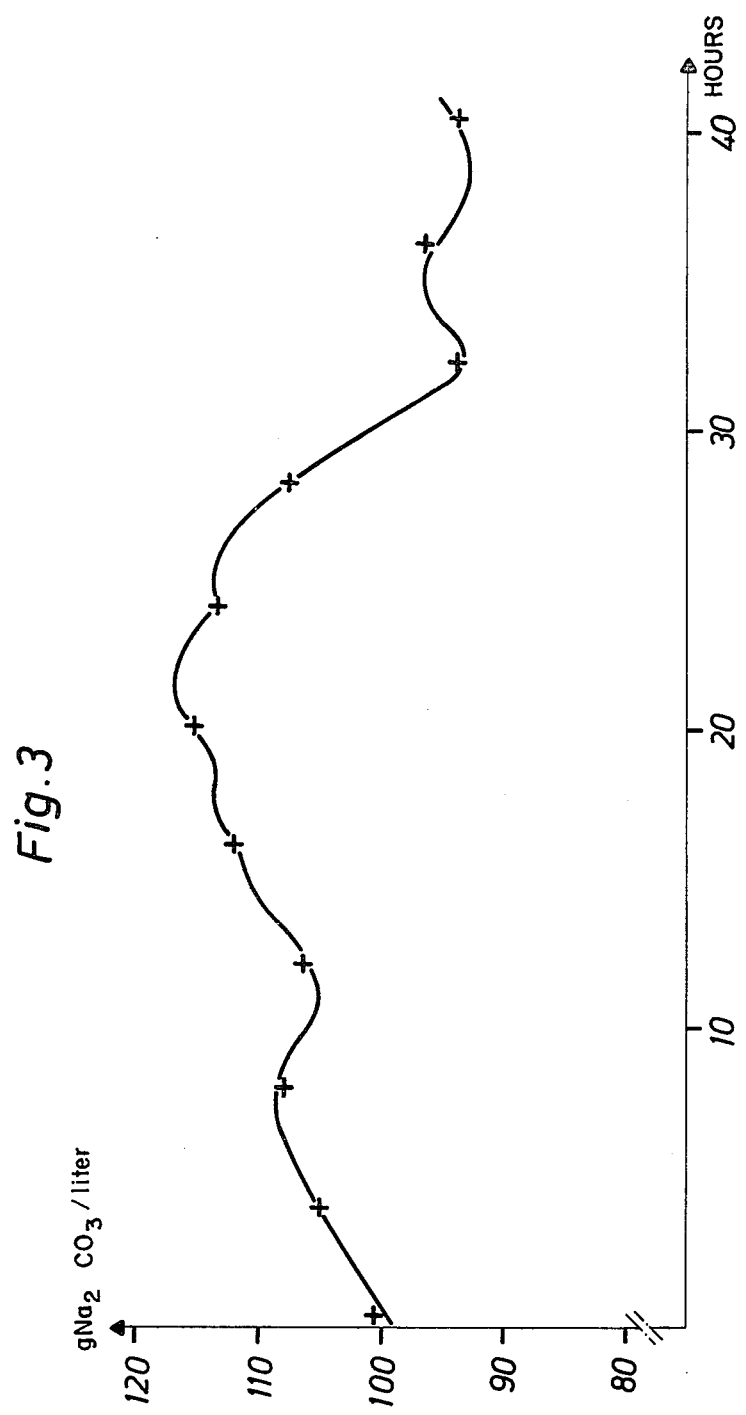
FIG. 3 is a graph showing the variations with time in sodium carbonate content determined as carbonate ion during a period of 40 hours in Example 2.

The variations in sodium carbonate content determined as carbonate ion during a period of 40 hours during which the measurements were taken are graphed in FIG. 3, in which the ordinate refers to grams of sodium carbonate per liter, and the abscissa to hours. The manual titrimetric analytical results are also given on the graph of FIG. 3 as crosses.

It is apparent from FIG. 3 that the analytical results taken in the apparatus according to the invention coincide with the manual titrimetric results, since the curves superimpose.

The actual values from which the curves are taken are given in Table II.

TABLE II

| | Carbonate ion content as $Na_2CO_3$ of green liquor (g/l) | | |
|---|---|---|---|
| Sample Run No. | Example 2 Method according to the invention | Control Manual titrimetric analysis according to SCAN-N 2:63 | Difference: Example 2 minus Control |
| 1 | 99.2 | 100.2 | −1.0 |
| 2 | 104.7 | 104.5 | +0.2 |
| 3 | 108.0 | 107.4 | +0.6 |
| 4 | 105.3 | 105.9 | −0.6 |
| 5 | 111.4 | 111.7 | −0.3 |
| 6 | 115.3 | 114.8 | +0.5 |
| 7 | 113.2 | 112.9 | +0.3 |
| 8 | 107.6 | 107.2 | +0.4 |
| 9 | 93.3 | 93.1 | +0.2 |
| 10 | 95.7 | 96.0 | −0.3 |
| 11 | 93.9 | 93.1 | +0.8 |

It is apparent from the above results that the variation is insignificant, and that the method according to the invention is very accurate.

EXAMPLE 3

In this Example, a series of runs was made in a pulp mill in which the analyzer system shown in FIG. 2 was first connected at point 20 for analysis of green liquor for one hour, and then connected at point 22 for analysis of white liquor for the next hour. It was then reconnected at point 20 for analysis of green liquor for another hour, and the alternate connections then continued for a total time of twenty-four hours. The time required for the liquor to travel from point 20 to point 22 via the slaker 19 and the causticizer 25 was one hour fifty minutes.

At the time of analysis of the white liquor the degree of causticization $K_2$ was calculated using the analytical values obtained two hours earlier on the green liquor. During the measurement period, the lime CaO flow and green liquor flow were kept constant.

Figure 4:
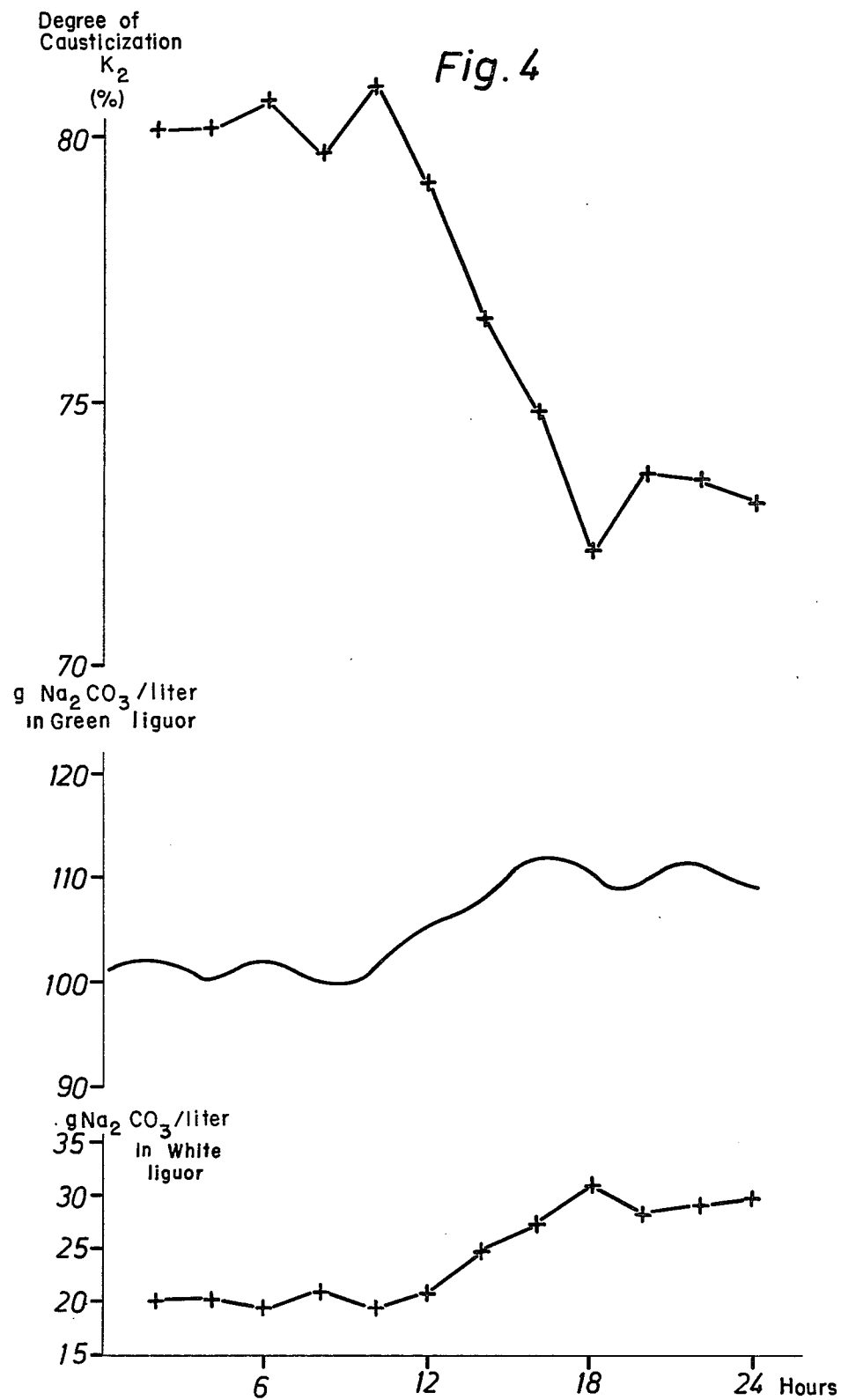
FIG. 4 shows the variations with time in the degree of causticization $K_2$, and in sodium carbonate content determined as carbonate ion of both green liquor and white liquor, during a period of 24 hours in Example 3.

The results are graphed in FIG. 4, in which the upper ordinate represents the degree of causticization $K_2$ in percent, the middle ordinate the carbonate concentration as $Na_2CO_3$ in g/l of the green liquor, and the lower ordinate the carbonate concentration as $Na_2CO_3$ in g/l of the white liquor. The abscissa for all three curves is in hours. Thus, FIG. 4 shows the results over a total measuring period of twenty-four hours.

The change in the sodium carbonate content concentration of the green liquor from about 100 to about 110, as observed, is well within the range of regulation possible with conventional equipment for keeping the green liquor strength constant. The large decrease in the degree of causticization $K_2$ resulting from the changes in sodium carbonate concentration shows the need for continuous regulation of carbonate content, and shows that the process of the invention in this connection is of considerable help.

The values on which these graphs in FIG. 4 are based are given in Table III:

TABLE III

| Run No. | Time (hrs) | Green Liquor $Na_2CO_3$ g/l | White Liquor $Na_2CO_3$ g/l | $K_2$ |
|---|---|---|---|---|
| 1 | 0 | 101.0 | — | — |
| 2 | 2 | 102.0 | 20.2 | 80.0 |
| 3 | 4 | 100.5 | 20.2 | 80.1 |
| 4 | 6 | 102.5 | 19.5 | 80.6 |
| 5 | 8 | 100.5 | 20.7 | 79.6 |
| 6 | 10 | 101.0 | 19.5 | 80.9 |
| 7 | 12 | 105.5 | 20.6 | 79.1 |
| 8 | 14 | 108.0 | 24.8 | 76.6 |
| 9 | 16 | 112.0 | 27.5 | 74.8 |
| 10 | 18 | 110.5 | 31.4 | 72.2 |
| 11 | 20 | 110.0 | 28.7 | 73.6 |
| 12 | 22 | 111.5 | 29.5 | 73.5 |
| 13 | 24 | 109.0 | 29.7 | 73.2 |

EXAMPLE 4

The process of the invention was used to control the amount of lime added in the causticization of green liquor in a pulp mill. In the Control Run A, the carbonate ion concentration of the green liquor was regulated by determining density, and the causticization was followed by white liquor analysis for carbonate ion concentration to determine the degree of causticization obtained. Changes in the addition of calcium oxide according to this determination were made manually. In the run according to the invention, Run B, the concentration of the green liquor was controlled by determining density, but the addition of calcium oxide was regulated automatically using a signal from the flow meter for green liquor, together with a signal from the green liquor analyzer of FIG. 2, according to the determination of carbonate ion concentration in the green liquor, and a signal from the white liquor analyzer of FIG. 2, according to the determination of carbonate ion concentration in the white liquor. In RUN A, the analyzer was also connected for analysis of the carbonate ion concentration in both green and white liquor, but the signal from the analyzer was not made available to the operator.

In both runs, the production of pulp was the same, and there were no noticeable disturbances in the chemicals recovery or pulping process. The transit time for the liquor from point 20 to point 22 via the slaker 19 and the causticizer 25 was about two hours.

In the course of both Runs A and B, an attempt was made to keep the degree of causticization at 80%.

The results obtained are shown in FIGS. 5 and 6; FIG. 5 shows the results obtained in Run A, and FIG. 6 the results obtained in Run B. In each of these Figures, the upper ordinate shows the degree of causticization $K_2$ in percent, and the lower ordinate the carbonate ion concentration in grams/liter. The abscissa for both graphs shows the time over which the measurements were made, twenty-four hours. The time intervals at which the amount of calcium oxide added was changed in Runs A and B are indicated by the arrows.

In the course of Run B, the amount of lime was changed continuously and automatically. After about twelve hours, a noticeable change in the amount added occurred, because of a change in the lime quality.

Comparison of the average values for the degree of causticization and the distribution in both Runs A and B shows that with the help of the process of the invention in Run B, one can very easily obtain and maintain a predetermined degree of causticization. Deviations from the desired value are much smaller in Run B when the process of the invention is applied, as is evident from the average values for the test, and the deviation from this average. In Run A, applying the known technique for analyzing carbonate ion concentration, one obtains an average value of 78.3 for the degree of causticization, and the deviation was ±8.2. In the application of the process of the invention, the corresponding average degree of causticization ws 79.8, and the deviation only ±3.5.

The values on which these graphs in FIGS. 5 and 6 are based are given in Table IV.

TABLE IV

| | Run No. | Time (hrs) | Green Liquor $Na_2CO_3$ g/l | White Liquor $Na_2CO_3$ g/l | $K_2$ |
|---|---|---|---|---|---|
| Control | A | 0 | 107.2 | — | — |
| | | 2 | 111.1 | 21.4 | 80.4 |
| | | 4 | 115.4 | 26.2 | 76.4 |
| | | 6 | 117.8 | 30.2 | 73.8 |
| | | 8 | 113.2 | 25.8 | 78.1 |
| | | 10 | 112.6 | 18.8 | 83.4 |
| | | 12 | 116.2 | 15.2 | 86.5 |
| | | 14 | 120.4 | 26.8 | 76.9 |
| | | 16 | 123.6 | 31.1 | 74.2 |
| | | 18 | 124.5 | 28.1 | 77.3 |
| | | 20 | 127.0 | 27.4 | 78.0 |
| | | 22 | 128.6 | 30.9 | 75.7 |
| | | 24 | (128.8) | 27.0 | 79.0 |
| Example 4 | B | 0 | 119.2 | — | — |
| | | 2 | 115.3 | 23.8 | 80.0 |
| | | 4 | 113.0 | 22.0 | 80.9 |
| | | 6 | 113.0 | 23.4 | 79.3 |
| | | 8 | 115.0 | 24.6 | 78.2 |
| | | 10 | 118.1 | 22.2 | 80.7 |
| | | 12 | 122.8 | 19.9 | 83.2 |
| | | 14 | 127.2 | 24.2 | 80.3 |

TABLE IV-continued

| Run No. | Time (hrs) | Green Liquor Na$_2$CO$_3$ g/l | White Liquor Na$_2$CO$_3$ g/l | K$_2$ |
|---|---|---|---|---|
| | 16 | 131.7 | 27.5 | 78.4 |
| | 18 | 132.6 | 29.1 | 77.9 |
| | 20 | 129.0 | 27.4 | 79.3 |
| | 22 | 125.7 | 24.3 | 81.2 |
| | 24 | (121.1) | 27.4 | 78.2 |

Having regard to the foregoing disclosure, the following is claimed as patentable and inventive embodiments thereof:

1. A process for controlling the degree of causticization of white liquor in its preparation from green liquor by the addition of calcium oxide, which comprises determining the sodium carbonate concentration of green liquor fed to the causticization; determining the sodium carbonate concentration of white liquor resulting from the causticization; and controlling the degree of causticization within a predetermined range according to both sodium carbonate concentrations so as to maintain the degree of causticization of the white liquor within the range despite variations in sodium carbonate concentration of the green liquor and variations in calcium oxide content of the calcium oxide added for causticization, said determining steps including acidifying samples of the green and white liquors and measuring the amount of carbon dioxide liberated upon the acidification to thereby determine the sodium carbonate concentration of the green and white liquors as carbonate ion concentration.

2. A process according to claim 1 in which the degree of causticization K$_2$ is determined by calculation in accordance with the relationship:

$$K_2 = \frac{[Na_2CO_3]_{green\ liquor} - [Na_2CO_3]_{white\ liquor}}{[Na_2CO_3]_{green\ liquor}}$$

wherein the [Na$_2$CO$_3$] represents sodium carbonate concentration in the green or white liquor.

3. A process according to claim 1 which comprises, prior to acidifying, oxidizing to sodium sulfate and thus inhibiting gas liberation from substances that are present in the green or white liquor samples that liberate gases in acidified solution.

4. A process according to claim 1 which comprises determining carbon dioxide liberated as a function of the pressure of carbon dioxide liberated.

5. A process according to claim 1 which comprises determining carbon dioxide liberated as a function of the volume of carbon dioxide liberated.

6. A process according to claim 1 which comprises determining carbon dioxide liberated as a function of the carbon dioxide flow.

7. A process according to claim 1 in which the acidification is by addition of sulfuric acid.

8. A process according to claim 1 in which the determination of carbonate ion concentration in the green liquor is made on samples of the green liquor taken directly before causticization, and the determination of carbonate ion concentration in the white liquor is made on samples of white liquor taken immediately after causticization.

9. A process according to claim 1 which comprises measuring the flow of green liquor and the carbonate ion concentration of the green liquor, and from this determining the flow of carbonate ion per unit time.

10. A process according to claim 1 which comprises measuring the flow of white liquor and the carbonate ion concentration of the white liquor, and from this determining the flow of carbonate ion per unit time.

11. A process according to claim 1 in which the calcium oxide is added as lime, and from the determination of carbonate ion in white liquor the variations in lime quality are detected and accommodated by adjusting the proportioning of the lime in accordance with carbonate ion concentration in the green liquor and in the white liquor samples.

12. A process according to claim 11 in which in addition to determining carbonate ion concentration sulfide ion concentration is determined by carrying out two analyses of the green or white liquor sample, and before acidification of the liquor in one analysis adding an oxidizing agent so as to destroy sulfide and determine only carbonate ion concentration as carbon dioxide gas, and in the other analysis omitting the oxidizing agent, so that sulfide is liberated as hydrogen sulfide gas upon acidification, and the sum of carbonate and sulfide ion concentration is determined in terms of the total amount of hydrogen sulfide and carbon dioxide gas, and then the determining of the amount of hydrogen sulfide liberated and therefore sulfide concentration by subtraction of amount of gas determined in the other analysis from the amount of gas determined in the one analysis.

13. A process according to claim 1 in which the determinations are carried out continuously on continuous flows of samples of green liquor and white liquor from continuous flows of green liquor and white liquor.

* * * * *

UNITED STATES PATENT AND TRADEMARK OFFICE
CERTIFICATE OF CORRECTION

PATENT NO. : 4,236,960
DATED : December 2, 1980
INVENTOR(S) : Bengt G. Hultman et al It is certified that error appears in the above-identified patent and that said Letters Patent are hereby corrected as shown below:

On cover page, in [56], line 8 : "Tajysi Monogaysl" should be --Tappi Monograph--
On cover page, in [56], line 11 : "Tajysi" should be --Tappi--
In Figure 5, next to the label "Fig. 5" : insert --(PRIOR ART)--
Column 2, line 9 : "shaker" should be --slaker--
Column 2, line 41 : "rections" should be --reactions--
Column 3, line 34 : "concentrtion" should be --concentration--
Column 3, line 62 : "$K_1 \sim K_2$" should be -- $K_1 \neq K_2$ --
Column 6, line 20 : "mesure-" should be --measure- --
Column 6, line 21 : "mesurement" should be --measurement--
Column 6, line 24 : "steam" should be --stream--
Column 10, line 42 : "ws" should be --was--

Signed and Sealed this

Fourth Day of February 1986

[SEAL]

Attest:

DONALD J. QUIGG

Attesting Officer

Commissioner of Patents and Trademarks